(12) United States Patent
Chow et al.

(10) Patent No.: US 12,519,954 B2
(45) Date of Patent: Jan. 6, 2026

(54) SYNCHRONIZED LOW-POWER VIDEO PLAYBACK

(71) Applicant: ATI TECHNOLOGIES ULC, Markham (CA)

(72) Inventors: Wing-Chi Chow, Markham (CA); Yee Shun Chan, Markham (CA); Nicholas James Chorney, Mississauga (CA); Minghua Zhu, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 48 days.

(21) Appl. No.: 17/956,601

(22) Filed: Sep. 29, 2022

(65) Prior Publication Data

US 2024/0114150 A1   Apr. 4, 2024

(51) Int. Cl.
*H04N 19/172* (2014.01)
*H04N 21/43* (2011.01)

(52) U.S. Cl.
CPC ....... *H04N 19/172* (2014.11); *H04N 21/4307* (2013.01)

(58) Field of Classification Search
CPC ............ H04N 21/4436; H04N 21/4307; G06F 1/3203; G06F 9/4418
See application file for complete search history.

(56) References Cited

U.S. PATENT DOCUMENTS

| | | | | |
|---|---|---|---|---|
| 2002/0067318 A1* | 6/2002 | Matsuzaki | .............. | G06F 3/147 345/1.1 |
| 2014/0118235 A1* | 5/2014 | Hong | ..................... | G09G 5/008 345/87 |
| 2016/0100125 A1* | 4/2016 | Chiba | ...................... | H04N 5/77 386/210 |
| 2020/0278735 A1* | 9/2020 | Ansari | ................... | G06F 1/3265 |
| 2023/0215401 A1* | 7/2023 | Kim | ........................ | G09G 5/008 345/213 |

* cited by examiner

*Primary Examiner* — Kyle M Lotfi

(57) ABSTRACT

A display processing device includes a display device interface and a processing unit. The processing is configured to transition at least a first component of the display processing system into a low-power state in response to an active region of a first video frame of a plurality of video frames having completed. A second component of the display processing device is configured to maintain a temporal count value corresponding to a current frame line of the plurality of video frames, and further to generate a first signal in response to the temporal count value corresponding to a first trigger value. The first signal causes the at least first component to transition out of the low-power state.

20 Claims, 7 Drawing Sheets

SYNCHRONIZED LOW-POWER VIDEO PLAYBACK

BACKGROUND

Processing systems, such as central processing units (CPUs), accelerated processing devices (APDs), other system-on-chips (SoCs), and the like, can typically support several power management states. One such power management state, the working system state, generally describes a state where the system is fully usable and fully energized. Under some conditions, such as if some or all of the system components are not being used, power is reduced for some or all of the components by entering a lower power system state from the working system state. For example, during non-active portions of video playback, components of a processing system can be placed into a low-power state. However, in many instances, placing components of the processing system into a low-power state during video playback introduces long-term drift in the playback and results in audio/video synchronization issues.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
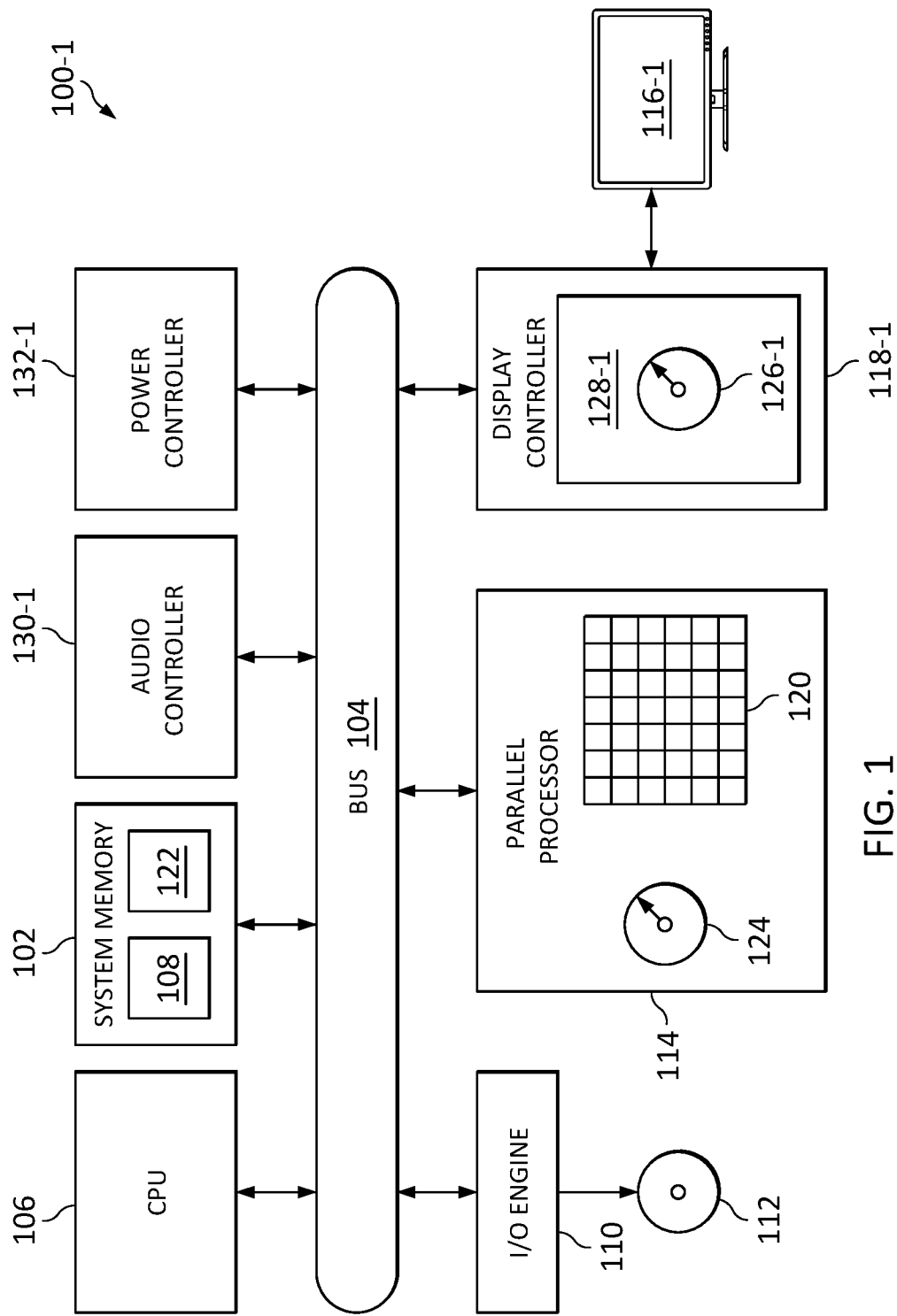
FIG. 1 is a block diagram of an example processing system in accordance with some implementations.

Components in processing systems (e.g., CPUs, parallel processors, APDs and other SoCs, and the like) can be operated in different power management states in which portions of the processing system can be deactivated or run at lower operating frequencies or voltages. For example, the power management states available to a processing system component may include active states, idle states, clock-gated states, power-gated states, and so on. In an active state, the component executes instructions (or performs operations) and runs at an operating frequency and operating voltage. In an idle state, the component does not execute instructions (or perform operations) and can be run at a lower operating frequency or operating voltage. In a power-gated state, the power supply is disconnected from the component by, for example, using a header transistor that interrupts the power supplied to the component when a power-gate signal is applied to a gate of the header transistor. The idle and power-gated states can be referred to as sleep or low-power states, and multiple levels of low-power states can be implemented by a processing system. In at least some implementations, while in the lowest (shallowest) power savings level of a low-power state, a component of a processing system consumes less power than when operating in the active state but consumes more power than the next higher (deeper) power savings level of a low-power state. When the component is placed in the highest (deepest) power savings level of a low-power state, the component is typically power-gated.

One opportunity for transitioning components of a processing system from an active state to a low-power state is during video playback. In more detail, during video playback, video rendered by a processor is provided to a display system in a stream of frames and displayed by a screen of the display system. The display video timing is determined by a frame rate (or refresh rate), a number of pixels per line in the frame (HTotal), a number of lines per frame (VTotal), and a pixel clock rate (PClk) that is equal to the product of the refresh rate, the number of pixels per line, and the number of lines per frame (also referred to herein as "lines", "video frame lines" or "scan lines"). The number of pixels per line includes a horizontal active region that includes pixel values used to generate images and a horizontal blanking region that conveys other information such as digital audio or metadata. Thus, the total number of pixels per line is equal to a sum of the pixels in the horizontal active region and the pixels in the horizontal blanking region. The number of lines per frame includes a vertical active region that includes pixel values and a vertical blanking region that conveys other information such as digital audio or metadata. Thus, the total number of lines per frame is equal to a sum of the lines in the vertical active region and the lines in the vertical blanking region. For example, a high definition frame can represent an image using 1080 active vertical lines that include values of the pixels and 45 vertical blanking lines. A line rate for the frame is defined as the pixel clock rate divided by the number of pixels per line or, equivalently, as the product of the refresh rate and the number of lines per frame.

The processing system performs different tasks during the active and blanking regions. While processing the horizontal and vertical active regions, the processing system accesses the data used to display images from a memory via one or more memory interfaces and data fabric interfaces. In contrast, during some or all the vertical blanking regions, there can be periods when no data is transferred over the memory/fabric interfaces. The processing system can utilize these gaps in display processing during vertical blanking regions to perform other operations, such as modifying a power state of one or more components of the processing system. However, the power management operations the processing system typically performs during the vertical blanking regions generally involve placing only a portion of the display controller, such as the physical layer (PHY) and interface link, in a lower power state between each video frame while maintaining the remaining components of the processing system in an active state, which limits the amount of power savings that can be realized during video playback. Also, conventional power management techniques can introduce long-term drift in the playback resulting from timing issues caused by powering down/up components during playback. Long-term drift is unacceptable, especially for audio/video synchronization. Conventional power management techniques can also require additional/complex hardware logic to maintain audio/video synchronization, which can increase power consumption.

The present disclosure describes implementations of systems and methods for synchronized low-power video playback. As described in greater detail below, a display processing device (e.g., a display controller) of a processing system performs power management operations during video playback such that multiple components of the processing system are placed in a low-power state during each frame of the video playback. For example, after a programmable duration of time has passed after the end of the vertical active region of a frame, the display processing device places one or more components of the processing system in a low-power state. Then, at a programmable duration of time before the start of the vertical active region of the next frame, the display processing device transitions the one or more components out of the low-power state and back into an active power state. Despite continuously powering multiple components on and off every frame, the display processing device is able to maintain continuous frame synchronization with minimal to no short-term jitter and no long-term drift, which is particularly important for audio/video synchronization. The display processing device achieves this audio/video synchronization by, for example, implementing a counter that is driven by a clock generator derived from the same clock source as the audio clock, which drives the audio controller. The counter ensures components are transitioned out of a low-power mode with sufficient time prior to the active region of the next video frame and also resynchronizes. Also, because the counter is synchronized with the audio controller, the counter is able to perform its operations in synchronization with the audio controller. In implementations, the display processing device also avoids the risk of introducing long-term drift by taking a snapshot of the counter a specified number of lines before the start of active video and using this snapshot as a reference point for resyncing a display timing generator used by the display processing device for outputting video frame data to a connected display device.

FIG. 1 is a block diagram of an example processing system 100 for implementing the synchronized low-power video playback techniques described herein according to some implementations. This instance of a processing system 100, referred to herein as processing system 100-1, includes or has access to a system memory 102 or another storage component that is implemented using a non-transitory computer readable medium, such as a dynamic random-access memory (DRAM). However, some implementations of the memory 102 are implemented using other types of memory including static RAM (SRAM), nonvolatile RAM, and the like. The processing system 100-1 also includes a bus 104 to support communication between entities implemented in the processing system 100-1. Some implementations of the processing system 100-1 include other buses, bridges, switches, routers, and the like, which are not shown in FIG. 1 in the interest of clarity.

The processing system 100-1 includes at least one central processing unit (CPU) 106. Some implementations of the CPU 106 include multiple processing elements (not shown in FIG. 1 in the interest of clarity) that execute instructions concurrently or in parallel. The processing elements are referred to as processor cores, compute units, or using other terms. The CPU 106 is connected to the bus 104 and communicates with the memory 102 via the bus 104. The CPU 106 executes instructions such as program code 108 stored in the memory 102 and the CPU 106 stores information in the memory 102 such as the results of the executed instructions. The CPU 106 is also able to initiate graphics processing by issuing draw calls.

An input/output (I/O) engine 110 handles input or output operations associated with elements of the processing system 100-1 such as keyboards, mice, printers, external disks, and the like. The I/O engine 110 is coupled to the bus 104 so that the I/O engine 110 communicates with the memory 102, the CPU 106, or other entities that are connected to the bus 104. In the illustrated implementation, the I/O engine 110 reads information stored on an external storage component 112, which is implemented using a non-transitory computer readable medium such as a compact disk (CD), a digital video disc (DVD), and the like. The I/O engine 110 also writes information to the external storage component 112, such as the results of processing by the CPU 106.

The processing system 100-1 includes at least one parallel processor 114 (e.g., graphics processing unit (GPU), machine learning (ML) application-specific integrated circuit (ASIC), etc.) that renders images for presentation by a display device 116 (an instance of which is depicted as a display device 116-1 in FIG. 1), which may include, for example, a screen, a monitor, a television, etc. For example, the parallel processor 114 renders objects to produce values of pixels that are provided by a display controller 118 (an instance of which is depicted as display controller 118-1 in FIG. 1) to the display device 116-1, which uses the pixel values to display an image that represents the rendered objects. The parallel processor 114 includes one or more processing elements, such as an array 120 of compute units that execute instructions concurrently or in parallel. Some implementations of the parallel processor 114 are used for general purpose computing. In the illustrated implementation, the parallel processor 114 communicates with the memory 102 (and other entities that are connected to the bus 104) over the bus 104. However, some implementations of the parallel processor 114 communicate with the memory 102 over a direct connection or via other buses, bridges, switches, routers, and the like. The parallel processor 114 executes instructions stored in the memory 102 and the parallel processor 114 stores information in the memory 102 such as the results of the executed instructions. For example, the memory 102 stores a copy 122 of instructions that represent a program code that is to be executed by the parallel processor 114. The parallel processor 114 also includes a timing reference/generator 124.

The parallel processor 114 generates a stream of frames that is provided to the display device 116-1. The parallel processor 114 renders frames at different refresh rates to match the various refresh rates supported by the display device 116-1. For example, the parallel processor 114 renders frames and provides them to the display device 116-1 at 50 Hz in response to determining that the display device 116-1 is presenting frames at 50 Hz. For another example, the parallel processor 114 renders frames and provides them to the display system at 60 Hz in response to determining that the display device 116-1 is presenting frames at 60 Hz.

In at least some implementations, the display device 116-1 supports a variable refresh rate so that the display device 116-1 can present frames at refresh rates within a range up to a maximum refresh rate. For example, the display device 116-1 can support refresh rates of 24 Hz, 25 Hz, 30 Hz, 50 Hz, 60 Hz, 100 Hz, and 120 Hz. The variable refresh rate corresponds to a variable vertical blanking region, which is within a range beginning at a minimum vertical blanking region that corresponds to the maximum refresh rate of the display device 116-1. In some implementations, the refresh rates are determined by querying the display device 116-1 for its Enhanced Extended Display Identification Data (E-EDID) and determining the refresh rates from the E-EDID reply supplied by the display device 116-1.

The display controller 118-1 reads out the pixel values in the frames from an output buffer/memory and uses the values to generate one or more signals for displaying an image on (or presenting an image to) the display device 116-1. The display controller 118-1 provides the video signal representing the frames via a physical interface, such as a high-definition multimedia interface (HDMI) or DisplayPort interface, coupled to the display device 116-1. The display controller 118-1 includes one or more timing references/generators 126 (an instance of which is depicted as a timing reference 126-1 in FIG. 1) that generate control signals, synchronization signals, clock signals (independently or in conjunction with other circuitry or devices), a combination thereof, or the like that are required for interfacing to the display device 116-1. In at least some implementations, the one or more timing references are synchronized to, for example, the parallel processor timing reference 124 (or another timing reference) during normal operation. Some implementations of the timing reference 126-1 are implemented in a timing controller (TCON) chip 128 (an instance of which is depicted as a TCON chip 128-1 in FIG. 1), e.g., as an ASIC or other circuit, which also performs timing and synchronization operations for the display device 116-1. Although the display controller 118-1 is illustrated in FIG. 1 as being separate from other components of the processing system 100-1, the display controller 118-1, in other examples, is part of another component(s), such as the I/O engine 110.

The processing system 100-1 also includes an audio processing device, such as an audio controller 130 (an instance of which is depicted as audio controller 130-1 in FIG. 1), for generating audio signals that can be output by the audio controller 130-1 or the I/O engine. In other implementations, the audio controller 130-1 is part of another component(s), such as the I/O engine 110. The processing system 100-1, in at least some implementations, further includes a power controller 132 (an instance of which is depicted as a power controller 132-1) in FIG. 1, such as a system management unit (SMU) or another type of power controller. The power controller 132-1 comprises hardware and firmware for managing and accessing system configuration/status registers and memories, generating clock signals, controlling power rail voltages, and the like for the processing system 100-1. The power controller 132-1 also controls the power supplied to components and sub-components of the processing system 100, such as the cores of the CPU 106 and parallel processor 114, the I/O engine 110, the display controller 118-1, and the like.

Figure 2:
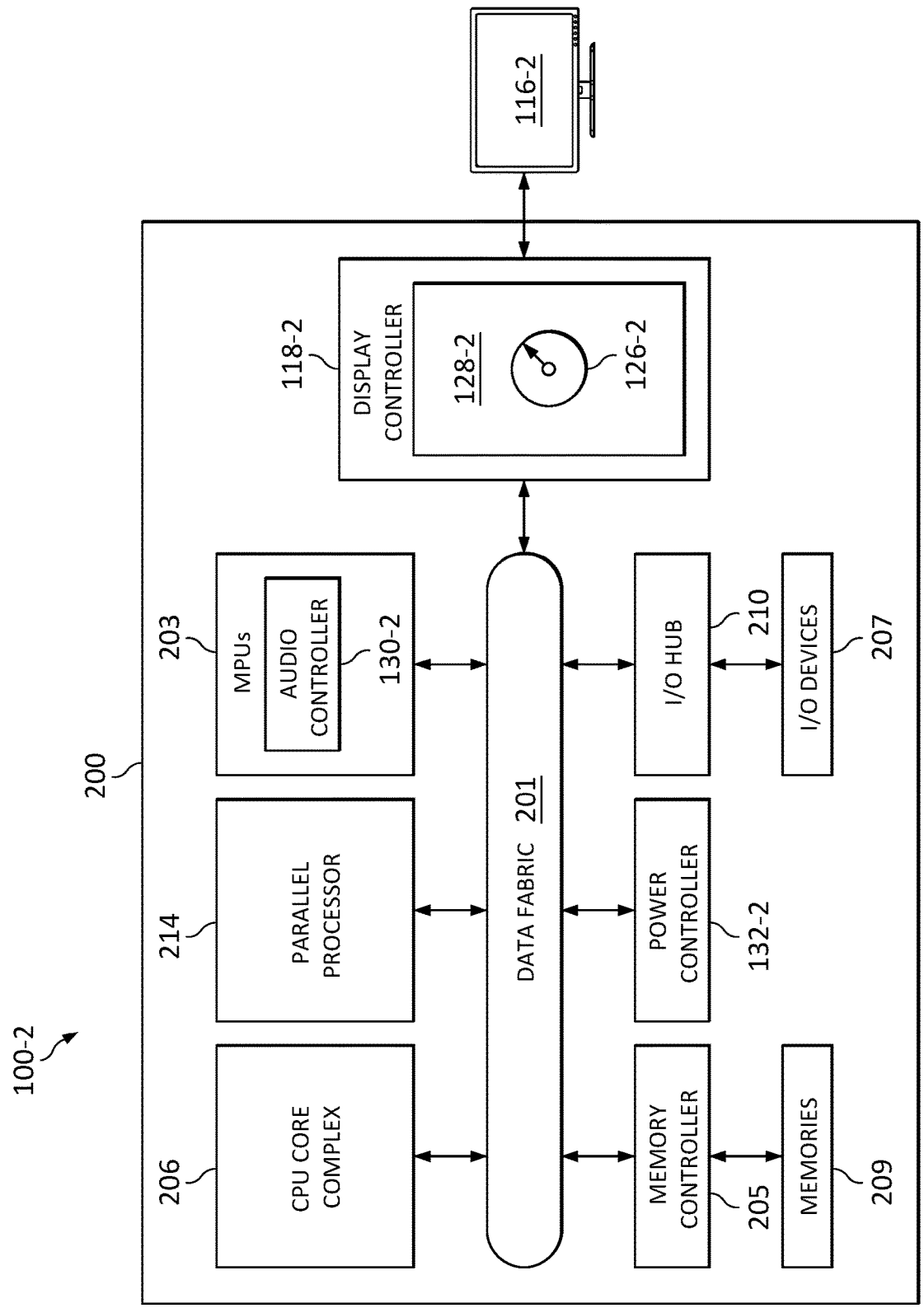
FIG. 2 is a block diagram of an example System-On-Chip device in accordance with some implementations.

FIG. 2 is a block diagram of another example of the processing system 100 for implementing the synchronized low-power video playback techniques described herein according to some implementations. This instance of the processing system 100 is referred to herein as processing system 100-2. In the example shown in FIG. 2, the processing system 100-2 is an SoC device 200, such as an APD or any other SoC capable of implementing one or more implementations described herein. In at least some implementations, the SoC device 200 includes components such as a data fabric 201, CPU core complex 206, parallel processor 214, multimedia processing units (MPUs) 203, display controller 118 (an instance of which is depicted as a display controller 118-2) in FIG. 2), I/O hub 210, memory controller 205, and power controller 132 ((an instance of which is depicted as a power controller 132-2 in FIG. 2). One or more of these and other components, in at least some implementations, are comprised of intellectual property (IP) blocks/cores, which are reusable units of logic, cells, or integrated circuit (IC) layouts.

The data fabric 201, in at least one implementation, includes circuitry for providing communication interconnections among the various components of the SoC device 200. Any suitable interconnection hardware is used in various implementations. In some implementations, from a physical standpoint, the data fabric 201 is implemented either in a central location of the SoC device or distributed to multiple hubs across the SoC device 200 and interconnected using a suitable communications medium (e.g., a bus). From a logical standpoint, the data fabric 201 is located at the center of data flow, and information regarding the idleness of different components (including IP blocks) of the SoC device 200 is concentrated (e.g., stored) in the data fabric 201.

In at least some implementations, the CPU core complex 206 includes one or more suitable CPU cores. Each of the cores in a complex, in at least some implementations, includes a private cache and all of the cores in a complex are in communication with a shared cache. In at least some implementations, the SoC device 200 includes a plurality of CPU core complexes. The parallel processor 214, in at least some implementations, includes any suitable parallel processor (e.g., GPU, ML ASIC, and the like) or a combination of parallel processors. The MPUs 203, in at least some implementations, include one or more suitable MPUs, such as audio controllers 130-2 or co-processors, imaging signal processors, video codecs, and so on.

The display controller 118-2, in at least some implementations, includes any suitable hardware for driving one or more display devices 116-2 (e.g., a screen, a monitor, a television, etc.) and is configured similar to the display controller 118-1 of the processing system 100-1 of FIG. 1. As similarly described above with reference to FIG. 1, the display controller 118-2 includes one or more timing references 126 (an instance of which is depicted as a timing reference 126-2 in FIG. 2) that generate control signals, synchronization signals, clock signals (independently or in conjunction with other circuitry or devices), a combination thereof, or the like that are required for interfacing to the display device 116-2. The timing reference(s), in at least some implementations, is synchronized to, for example, a timing reference of the parallel processor 214 or another timing reference during normal operation. Some implementations of the timing reference 126-2 are implemented in a timing controller (TCON) chip 128 (an instance of which is depicted as a TCON chip 128-2 in FIG. 2), e.g., as an ASIC or other circuit.

The I/O hub 210, in at least some implementations, includes any suitable hardware for interfacing the data fabric 201 with I/O devices 207. The I/O devices 207, in at least some implementation, include one or more of a universal serial bus (USB), peripheral component interconnect express (PCIe) bus, non-volatile memory host controller interface (NVMe) bus, serial advanced technology attachment (SATA) bus, gigabit Ethernet (xGBE), inter-integrated circuit (I2C) bus, secure digital (SD) interface, general-purpose input/output (GPIO) connection, sensor fusion I/O connection, and or any other suitable I/O hardware. Accordingly, in at least some implementations, the I/O hub 210 includes a USB host controller, PCIe root complex, NVMe host controller, SATA host controller, xGBE interface, I2C node, SD host, GPIO controller, sensor fusion controller, and or any other suitable I/O device interfaces. The memory controller 205, in at least some implementation, includes any suitable hardware for interfacing with one or more memories 209.

The power controller 132-2, which can include an SMU or another type of power controller, comprises hardware and firmware for managing and accessing system configuration/status registers and memories, generating clock signals, controlling power rail voltages, and enforcing security access and policy for the SoC device 200. In at least some implementations, the power controller 132-2 is interconnected with the other blocks of the SoC device 200 using a system management communication network (not shown). The power controller 132-2, in at least some implementations, also manages thermal and power conditions of the CPU core complex 206 and other components (including individual IP blocks) of the SoC device 200. As such, the power controller 132-2 is able to control power supplied to components and sub-components of the SoC device 200, such as the cores of the CPU core complex 206, parallel processor 214, the display controller 118-2, IP blocks, and the like.

As described in greater detail below, in addition to generating and outputting video signals to the display device 116, the display controller 118 of one or more implementations (e.g., display controller 118-1 or 118-2) further operates to place one or more components of the processing system 100 (e.g., processing system 100-1 or processing system 100-2) in a low-power state/state during video playback, such as during the vertical blanking region/portion of each frame of the video playback. In at least some implementations, the display controller 118 maximizes power savings during video playback by placing multiple components of the display controller 118 (i.e., not just the physical interface PHY and link) and the processing system 100 into a low-power state during the vertical blanking regions of each frame instead of just the physical interface PHY and the Link, which is the transmission channel(s) between the source (e.g., display controller 118) and the sink (e.g., display device 116-1). The display controller 118 also transitions these components back into an active state prior to the vertical active region/portion of each frame. Although the display controller 118 is able to continuously transition components of the processing system 100 into and out of a low-power state during video playback, the display controller 118 avoids introducing drift in the playback and avoids audio/video synchronization issues by implementing a low-power state synchronization counter controller 304 (FIG. 3) (also referred to herein as "counter controller 304"). The display controller 118 uses a counter value 322 (FIG. 3) (also referred to herein as "counter 322") to determine when to transition components out of a low-power state during the vertical blanking region of each frame and also to resynchronize the timing reference 126 of the display controller 118 to a common reference point in each video frame.

It is noted that throughout this description, reference to transitioning a component of the processing system 100 to/from a low-power state includes any of: transitioning the entire processing system 100 including the display controller 118 (with the exception of at least the counter controller 304); transitioning an entire component, such as the CPU core complex 106, parallel processor 114, and so on; transitioning a sub-component of a component, such as a core of the CPU core complex 106 or an IP block; or a combination of transitioning one or more entire components of a subset of components and transitioning one or more sub-components of one or more components of another subset of components.

Figure 3:
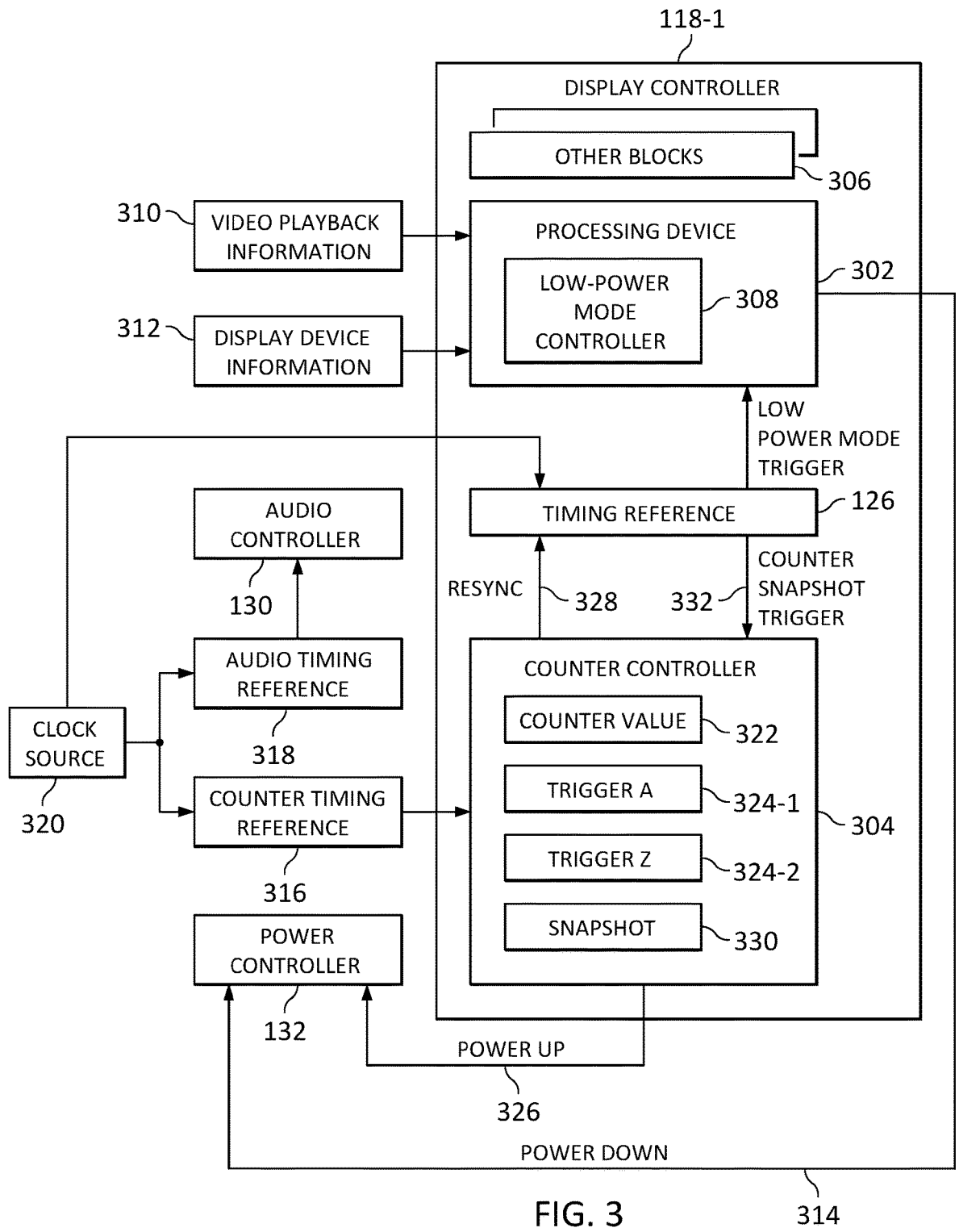
FIG. 3 is a block diagram illustrating a detailed view of a display controller configured to perform synchronized low-power video playback in accordance with some implementations.
Figure 4:
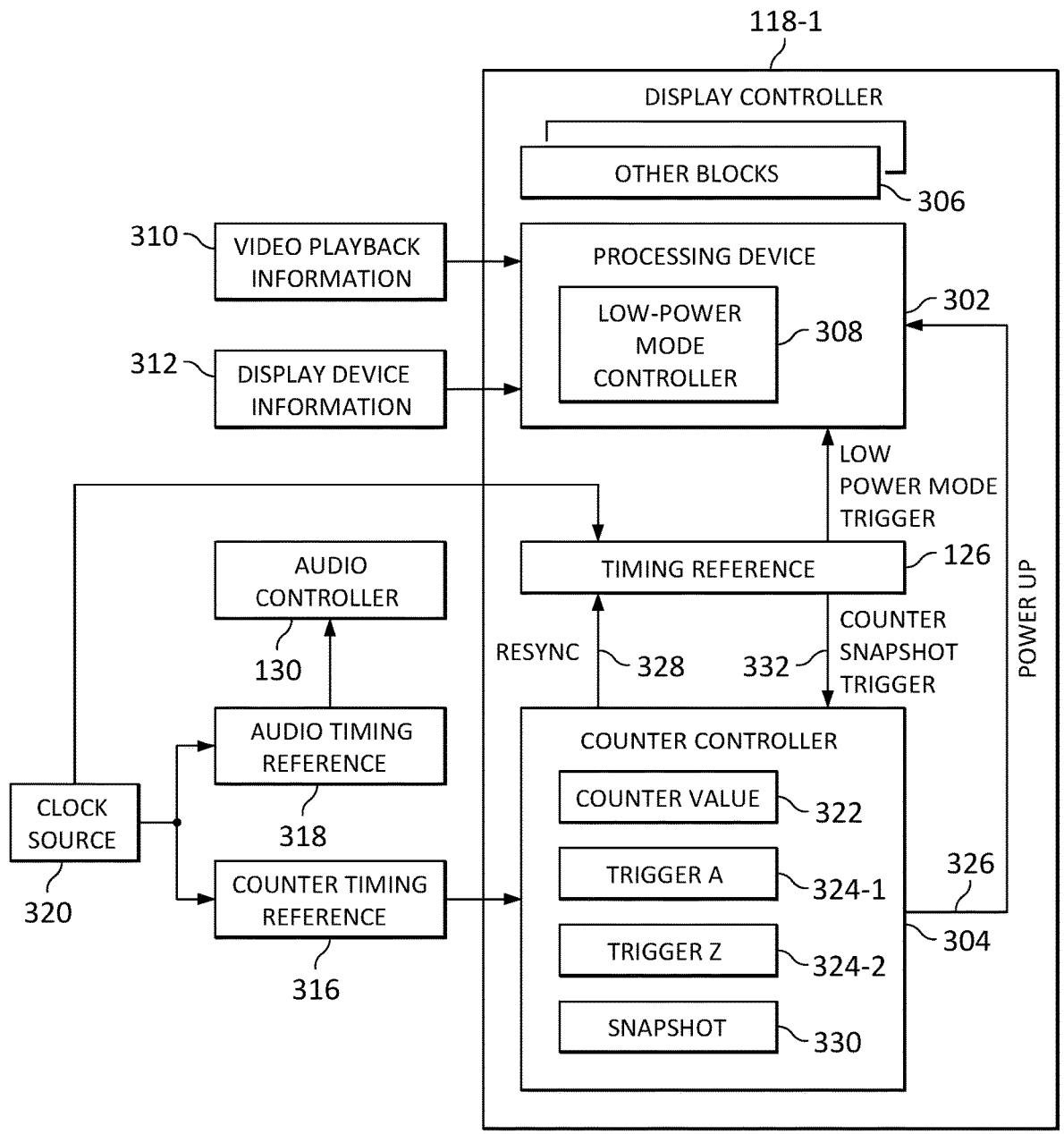
FIG. 4 is a block diagram illustrating another detailed view of a display controller configured to perform synchronized low-power video playback in accordance with some implementations.

FIG. 3 and FIG. 4 are block diagrams illustrating examples of a more detailed view of the display controller 118 and the various components implemented by the display controller 118 for performing synchronized low-power video playback. In FIG. 3 and FIG. 4, the display controller 118 includes a processing device 302, the timing reference 126, and the counter controller 304. It should be understood that the display controller 118 includes other components 306 (e.g., image fetching, image scaling, color conversion, blending/compositing, etc.) that are not shown in FIG. 3 and FIG. 4 in the interest of clarity. In at least some implementations, the processing device/unit 302 is a microcontroller, a microprocessor, a microsequencer, or the like, and governs the functions performed by the display controller 118, such as generating and outputting video signals to the display device 116 and the like.

In at least some implementations, the processing device 302 includes a low-power mode controller 308, which is implemented as hardware, firmware, a combination thereof, and the like. The low-power controller 308, in at least some implementations, performs one or more of the synchronized low-power video playback operations described herein. For example, the low-power mode controller 308 enables or disables a low-power management mode of the display controller 118 for low-power video playback operations of one or more implementations. In at least some implementations, the low-power mode controller 308 enables the low-power management mode when the duration of vertical blanking regions of the video frames in the playback satisfies a threshold, i.e., the duration of vertical blanking regions is sufficient to transition components into and out of a low power state during the vertical blanking regions. If the duration of the vertical blanking regions does not satisfy the threshold, the low-power mode controller 308 disables or does not enable the low-power management mode.

The low-power mode controller 308, in at least some implementations, uses information, such as video playback information 310 and display device information 312, to determine whether to enable/disable the low-power management mode and when to perform the power management operations during video playback. The video playback information 310 includes (or is used to determine) information such as the video frame rate associated with the playback, the number of pixels per line in a frame (HTotal), the number of lines per frame (VTotal), and the pixel clock rate (PClk), the duration of active and blanking regions of the frames, and the like. The display device information 312 includes (or is used to determine) information such as refresh rate of the display device 116, dynamic refresh rate (DRR) capabilities of the display device 116, and the like. In at least some implementations, the video playback information 310 and the display device information 312 is provided by components of the processing system 100, such as the operating system, display driver(s), and the like.

The low-power mode controller 308, in at least some implementations, uses one or more of the video playback information 310 or the display device information 312 to determine when to place one or more components of the processing system 100 in a low-power state during video playback. For example, based on one or more of the video playback information 310 or the display device information 312, the low-power mode controller 308 identifies/detects (e.g., by monitoring a number of lines, a duration of time, or the like) when the vertical active region of a frame begins and ends. In response to determining that the vertical active region of the frame has ended, the low-power mode controller 308 generates and outputs a power-down signal 314 to the power controller 132. Based on receiving the power-down signal 314, the power controller 132 places one or more components of the processing system 100 in a low-power state by, for example, initiating deep-sleep clocks, performing clock-gating, performing power-gating, turning power rails off, a combination thereof, or the like. In at least some implementations, the power controller 132 is preconfigured with information identifying the components of the processing system 100 and the display controller 118 to place in the low-power state. For example, the power controller 132 can be preconfigured to first place the PHY of the display controller 118 into a low power state, then other components of the processing system 100, such as the CPU 106 or CPU core complex 206, the parallel processor 114 or parallel processor 214, and the like. The power controller 132, in at least some implementations, is also preconfigured with information identifying the sequence to place multiple components in the low-power state. Alternatively, the low-power mode controller 308 can inform the power controller 132 of which components to place in the low-power state and in what sequence.

In at least some implementations, the counter controller 304 implements a free-running counter 322 (also referred to herein as "counter value 322"), but other types of counters are applicable as well. The counter controller 304 is driven by a counter timing reference 316 (also referred to herein as "counter clock generator 316") that generates, for example, clock signals (independently or in conjunction with other circuitry or devices), or the like that are used by the counter controller 304 to perform one or more counting operations. For example, the counter controller 304 stores an incremented counter value(s) 322 in one or more registers upon the edge of each clock signal generated by the counter timing reference 316. The counter value 322, in at least some implementations, is a temporal count (i.e., a count that is incremented after a constant period of time, such as a clock cycle, has passed). In at least some implementations, the counter value 322 has a one-to-one correspondence to or is a multiple of the line number in the frame currently being output to display device 116 (or processed at the display device 116) or a point in time corresponding to the current line of the frame. In at least some implementations, the counter timing reference 316 is synchronized with an audio timing reference 318 (also referred to herein as "audio clock generator 318") using, for example, the same timing/clock source 320. The audio timing reference 318 generates, for example, clock signals (independently or in conjunction with other circuitry or devices), or the like that are used by the audio controller 130 to generate and output audio signals. Synchronizing the counter timing reference 316 and the audio timing reference 318 to the same clock source 320 mitigates any video/audio drift in the video playback resulting from components of the processing system 100 entering/exiting the low-power state during each frame of the playback.

The counter controller 304, in at least some implementations, is located in an always-on power island of the display controller 118. Stated differently, the counter controller 304 remains powered on during video playback when a low-power state is being implemented by the display controller 118. In at least some implementations, the low-power mode controller 308 programs the counter controller 304 such that the counter controller 304 generates various signals when different counter values are reached. For example, the processing device 302 programs the counter controller 304 with a first trigger value 324-1 that causes the counter controller 304 to generate/output a power-up signal/interrupt 326, and a second trigger value 324-2 that causes the counter controller 304 to generate a timing reference resyncing signal/interrupt 328 (also referred to herein as "resync signal 328"). In at least some implementations, the trigger values 324 are stored in one or more registers of the counter controller 304. The counter controller 304, in at least some implementations, sends the power-up signal 326 to the power controller 132. Based on receiving the power-up signal 326, the power controller 132 transitions the component(s) of the processing system out of the low-power state. However, in FIG. 4, the processing device 302 of FIG. 4 receives the power-up signal 326 from the counter controller 304 and performs the operations of the power controller 132 illustrated in FIG. 3, such as powering down and powering up components of the display controller 118 and processing system 100.

The counter controller 304, in at least some implementations, sends the resync signal 328 to the timing reference 126 of the display controller 118. The resync signal 328 causes the timing reference 126 to be resynced to a specified number of lines before the start of the vertical active region of the next frame of the video playback. Resyncing the timing reference 126 to a common reference point ensures that the video playback remains synchronized while enabling the display controller 118 to continuously power down and power up multiple components of the processing system 100 during each frame of the playback.

Figure 5:
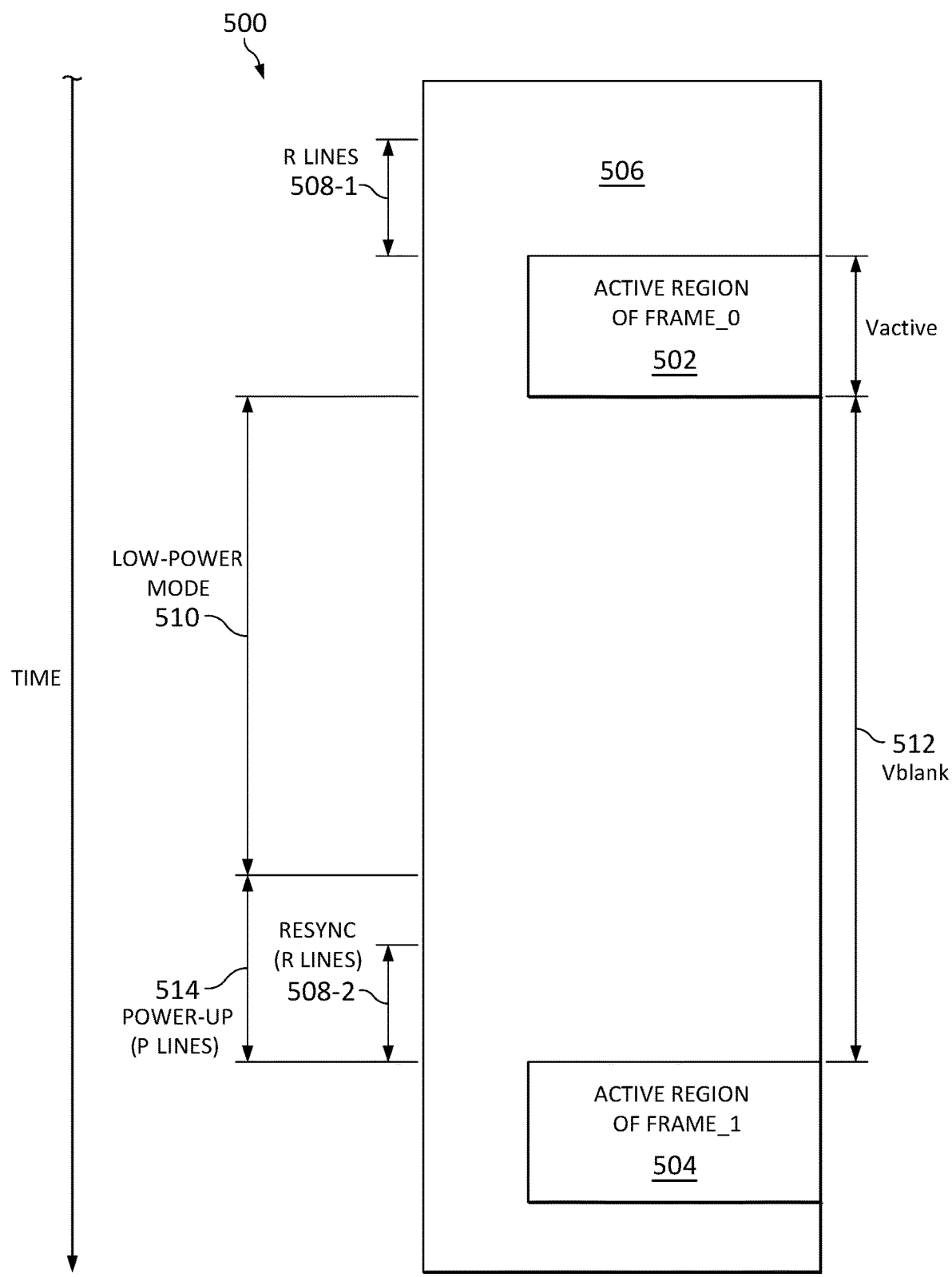
FIG. 5 is a diagram illustrating the timing of various operations performed by the display controller of FIG. 3 or FIG. 4 during playback of video frames when implementing a low-power management mode in accordance with some implementations.

In at least some implementations, the low-power mode controller 308 (or the counter controller 304) captures a master reference counter value by taking and storing a snapshot 330 of the counter value 322 at an initial reference point when video playback begins. For example, FIG. 5 illustrates a portion 500 of a video playback stream. In this example, the unshaded areas represent the active regions of the video playback portion 500 and the shaded areas represent the blanking regions of the video playback portion 500. In the example shown in FIG. 5, the vertical active (Vactive) region 502 of a first frame (Frame_0) and the vertical active (Vactive) region 504 of the next frame (Frame 1) of the video playback portion 500 are identified. The vertical blanking (Vblank) regions 506 before the Vactive region 502 of Frame_0, between the Vactive region 502 of Frame_0 and the Vactive region 504 of Frame_1, and after the Vactive region 504 of Frame_1 are also identified in FIG. 5. A given (programmable) number of lines (represented as R lines 508-1 in FIG. 5) prior to the start of the Vactive region 502 of Frame_0, the low-power mode controller 308 (or counter controller 304) takes and stores a snapshot 330 of the current counter value 322. In at least some implementations, the timing reference 126 generates a snapshot signal/interrupt 330 (FIG. 3) at R lines 508-1 before the Vactive region 502 of Frame_0, which triggers the low-power mode controller 308 (or counter controller 304) to take the snapshot 330 of the current counter value 322. In other implementations, the low-power mode controller 308 (or counter controller 304) monitors the timing reference 126 and detects when R lines 508-1 (or a duration of time representing R lines 508-1) before the Vactive region 502 of Frame_0 have occurred.

The low-power mode controller 308 uses the snapshot 330 to calculate the first trigger value 324-1 for triggering the power-up signal 326 and to calculate the value 324-2 for triggering the resync signal 328. Stated differently, the low-power mode controller 308 calculates these values 324 to match the values of the counter 322 P lines 514 and R lines 508-1 before the Vactive region 504 of Frame_1. The low-power mode controller 308 calculates the values 324 for each frame subsequent to Frame_0, i.e., for video frames i, where i=1, 2, 3, . . . n. In at least some implementations, one or more of the first trigger value 324-1 or the second trigger value 324-2 is based on one or more of the trigger values of the previous frame(s). The low-power mode controller 308 (or counter controller 304), in at least some implementations, sets the first trigger value 324-1 such that the power-up signal 326 is generated during the vertical blanking region at a given (programmable) number of lines before the active region 504 of the subsequent frame. For example, FIG. 5 shows that the first trigger value 324-1 is set such that when the low-power state 510 is entered after the vertical active region 502 of Frame_0 has completed, the power-up signal 326 is generated during the vertical blanking region 512 before the active region of Frame_1 at a specified number of lines (represented as P lines 514 in FIG. 5, P>=1) before the vertical active region 504 of Frame_1 begins. The power-up signal 326 causes the power controller 132 to transition each component out of the low-power state either at the same time or in a programmable sequence.

In at least some implementations, the low-power mode controller 308 (or counter controller 304) sets the second trigger value 324-2 such that the resync signal 328 is generated during the vertical blanking region at a specified number of lines before the active region 504 of the subsequent frame but after the power-up signal 326 has been generated. For example, FIG. 5 shows that the second trigger value 324-2 is set such that when the low-power state 510 is entered after the vertical active region 502 of Frame_0 has completed, the resync signal 328 is generated during the vertical blanking region 512 between Frame_0 and Frame_1 at a specified number of lines (represented as R lines 508-2 in FIG. 5) before the vertical active region 504 of Frame_1 begins. The resync signal 328 causes the timing reference 126 of the display controller 118 to resynchronize to the $R^{th}$ line before the vertical active region 504 of Frame_1. In at least some implementations, the power-up signal 326 and the resync signal 328 are triggered at the same time. The example described above with respect to FIG. 5 also applies to each remaining frame of the video playback. In other implementations, a snapshot is taken of the counter value 322 for each frame to create a frame reference counter value that is used in addition to or in place of the master reference counter value described above. In these implementations, the snapshot of the counter value 322 is taken at a given (programmable) number of lines prior to the start of the Vactive region of each frame. The trigger values 324 for each frame are then calculated and programmed into the counter controller 304 based on the previous frame's trigger values, the number of video frames, the master reference counter value, or a combination thereof. Also, the low-power mode controller 308 is able to calculate/program the trigger values 324 into, for example, registers of the counter controller 304 anytime between the start of the frame but prior to the low-power state being activated.

Figure 6:
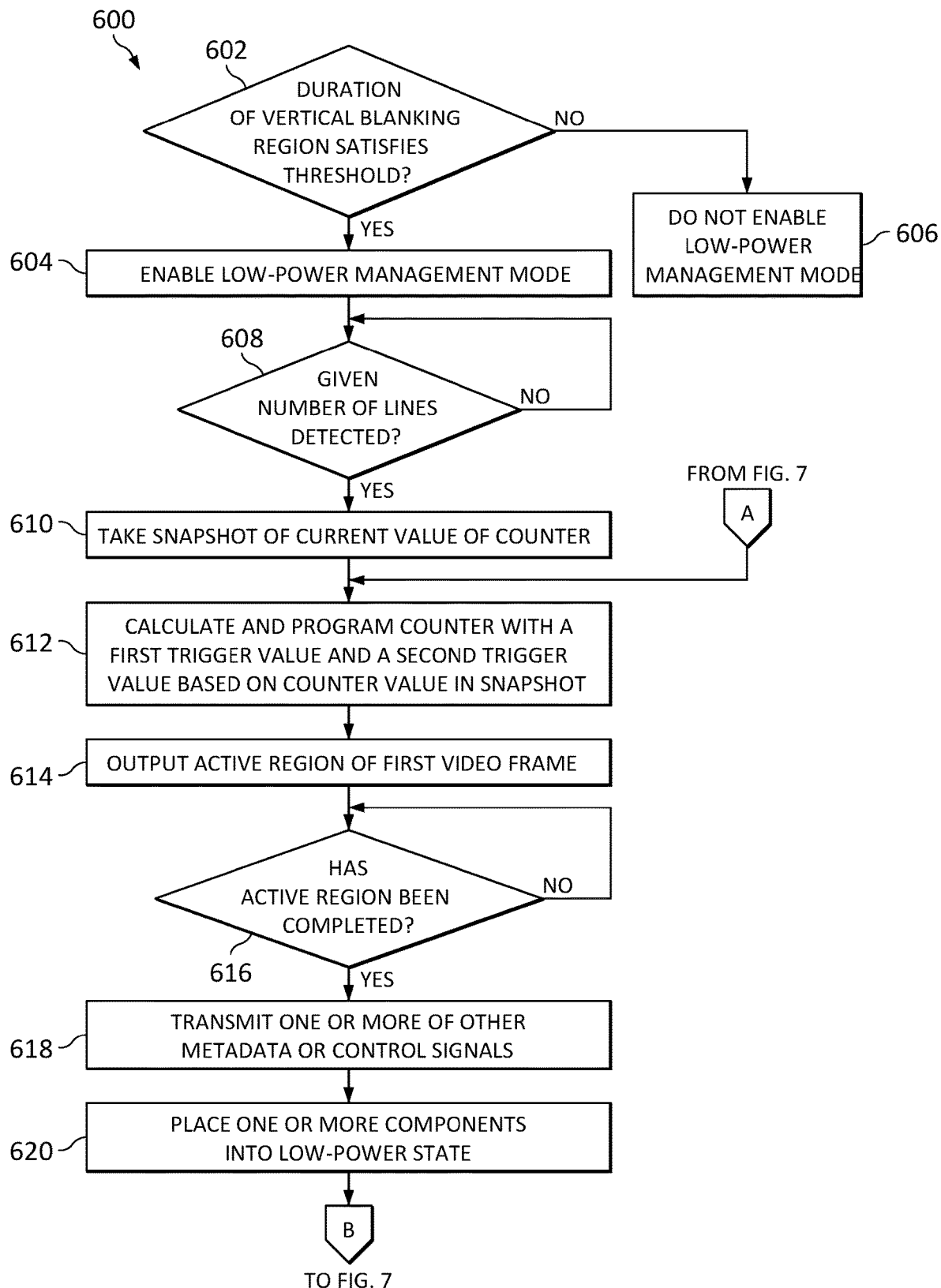
FIG. 6 and FIG. 7 together are a flow diagram illustrating an overall example method of performing synchronized low-power video playback in accordance with some implementations.
Figure 7:
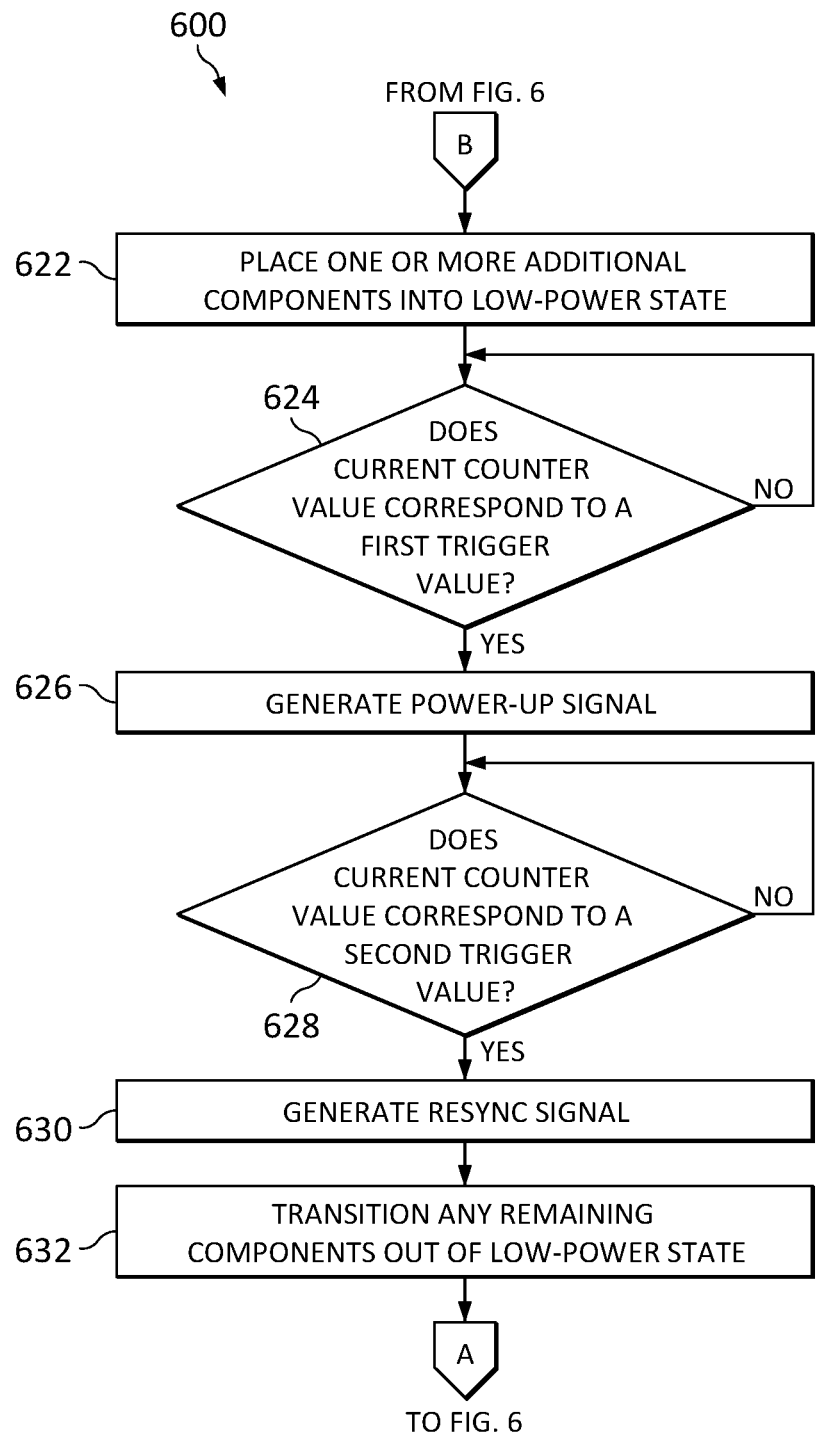

FIG. 6 and FIG. 7 together illustrate, in flow chart form, an overview of one example method 600 for performing synchronized low-power video playback. It should be understood the processes described below with respect to method 600 have been described above in greater detail with reference to FIG. 1 to FIG. 5. Also, one or more blocks may be omitted from or added to the method 600 shown in FIG. 6 and FIG. 7. At block 602, the display controller 118 determines if a duration of vertical blanking region(s) of at least one video frame of a plurality of video frames to be presented on a display device 116 satisfies a threshold. At block 604, the display controller 118 enables a low-power management mode responsive to the duration of vertical blanking region(s) satisfying the threshold. Otherwise, at block 606, the display controller 118 does not enable (or disables) the low-power management mode, and the video frames are processed without the synchronized low-power video playback techniques described herein.

At block 608, the display controller 118 determines if a specified number of lines 508-1 before the start of an active region 502 of a first video frame of the plurality of video frames have occurred. If the specified number of lines 508-1 has not occurred, the display controller 118 continues to monitor for the specified number of lines. At block 610, if the specified number of lines 508-1 has occurred, the display controller 118 takes a snapshot 330 of a current counter value 322 of the counter controller 304 implemented by the display controller 118. At block 612, the display controller 118 calculates and programs the counter controller 304 with a first trigger value 324-1 and a second trigger value 324-2 based on the snapshot value 330. When the current counter value 322 equals the first trigger value 324-1, the counter controller 304 (or another component of the display controller 118) generates a power-up signal 326 that causes one or more components that have been placed into a low-power state by the display controller 118 to transition out of the low-power state. When the current counter value 322 equals the second trigger value 324-2, the counter controller 304 (or another component of the display controller 118) generates a resync signal 328 that causes the timing reference 126 of the display controller 118 to resynchronize to a specified number of lines 508-2 before the start of an active region 504 of a second video frame of the plurality of video frames. In at least some implementations, the second trigger value 324-2 is configured to correspond to frame line or a duration of time subsequent to the frame line or duration of time corresponding to the first trigger value 324-1. It should be understood that, in at least some implementations, the operations performed at block 612 can be performed at any point between taking the snapshot of the counter value 322 (block 610) and placing all targeted components into the low-power mode (block 622) or any time between transitioning a component out of the low-power state (block 626) before the Vactive region 504 of the next frame and placing all targeted components into the low-power mode (block 622) after the Vactive region 504 of the next frame.

At block 614, the active region 502 (Vactive) of the first video frame is output by the display controller 118 and displayed by the display device 116. At block 616, the display controller 118 determines if the active region 502 of the first frame has been completed. If the active region 502 has not been completed, the display controller 118 continues to monitor for the completion of the active region 502. In at least some implementations, if the active region 502 of the first frame has been completed, the display controller 118 transmits, at block 618, one or more of additional metadata or control signals to indicate, for example, that the Link will be placed in a low-power state. At block 620, the display controller 118 places one or more components of the processing system 100, the display controller 118, or a combination thereof into a low-power state after (or upon) the vertical blanking (Vblank) region 512 of the first frame. For example, the display controller 118 places its PHY and Link into a low-power state. At block 622 the display controller places one or more additional components of the processing system 100, the display controller 118, or a combination thereof. For example, the display controller 118 places the CPU 106, parallel processor 114, or the like into a low-power state. In at least some implementations, a multi-step process/sequence is not performed to place multiple components into the low-power state. In these implementations, the display controller 118 places all targeted components into the low-power state at block 620. Also, in at least some implementations, the display controller 118 directly places the components into the low-power state. In other implementations, the display controller 118 sends a power-down signal 314 to a power controller 132, which places the components into the low-power state.

At block 624, the counter controller 304 determines if the current counter value 322 corresponds to the first trigger value 324-1. If the current counter value 322 does not correspond to the first trigger value 324-1, the counter controller 304 continues to monitor the current counter value 322. At block 626, if the current counter value 322 corresponds to the first trigger value 324-1, which indicates that a specified number of lines 514 (or a specified amount of time) prior to the start of the active region 504 of a second video frame have occurred, the counter controller 304 (or another component) generates a power-up signal 326. The power-up signal 326 causes the one or more components placed in the low-power state during the vertical blanking region 512 to transition out of the low-power state. The display controller 118 can directly transition the components out of the low-power state or have the power controller 132 transition the components out of the low-power state.

At block 628, the counter controller 304 determines if the current counter value 322 corresponds to the second trigger value 324-2. If the current counter value 322 does not correspond to the second trigger value 324-2, the counter controller 304 continues to monitor the current counter value 322. At block 630, if the current counter value 322 corresponds to the second trigger value 326-1, which indicates that a specified number of lines 508-2 (or a specified amount of time) prior to the start of the active region 504 of a second video frame have occurred, the counter controller 304 (or another component) generates a resync signal 328. The resync signal 328 causes the timing reference 126 of the display controller 118 to resynchronize to the frame line represented by the second trigger value 324-2. At block 632, the display controller 118 transitions any remaining components out of the low-power state that were not transitioned out of the low-power state at block 626. The flow returns to block 612 and the process described above is repeated for the next video frame.

In some implementations, the apparatus and techniques described above are implemented in a system including one or more integrated circuit (IC) devices (also referred to as integrated circuit packages or microchips). Electronic design automation (EDA) and computer-aided design (CAD) software tools, in at least some implementations, are used in the design of the standard cells and the design and fabrication of IC devices implementing the standard cells. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code, in at least some implementations, includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device, in at least some implementations, is stored in and accessed from the same computer-readable storage medium or a different computer-readable storage medium.

A computer-readable storage medium, in at least some implementations, includes any non-transitory storage medium or combination of non-transitory storage media accessible by a computer system during use to provide instructions and or data to the computer system. Such storage media, in at least some implementations, includes, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium, in at least some implementations, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer-readable storage medium. The software, in at least some implementations, includes the instructions and certain data that, when executed by the one or more processors, manipulate the one or more processors to perform one or more aspects of the techniques described above. The non-transitory computer-readable storage medium, in at least some implementations, includes, for example, a magnetic or optical disk storage device, solid-state storage devices such as Flash memory, a cache, random access memory (RAM), or other non-volatile memory device or devices, and the like. The executable instructions stored on the non-transitory computer-readable storage medium, in at least some implementations, is in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified, and all such variations are considered within the scope of the disclosed subject matter. Accordingly, the protection sought herein is as set forth in the claims below.

What is claimed is:

1. A method comprising:
responsive to detecting an active region of a first video frame of a plurality of video frames has been processed, transitioning at least one component of a processing system into a low-power state; and
generating a first signal based on an external timing reference, the first signal causing the at least one component to transition out of the low-power state.

2. The method of claim 1, wherein generating a first signal comprises generating the first signal at a specified number of lines prior to a start of an active region of a second video frame of the plurality of video frames.

3. The method of claim 1, further comprising:
capturing a snapshot of a current value of a counter at a specified number of lines prior to the active region of the first video frame; and
calculating a predetermined time interval associated with a temporal count based on the snapshot, the temporal count being synchronized with the external timing reference.

4. The method of claim 3, further comprising:
programming a value corresponding to the predetermined time interval into a counter controller.

5. The method of claim 1, further comprising:
generating a second signal in response to a first predetermined time interval corresponding to a temporal count, the second signal causing a timing reference of a display processing device outputting the plurality of video frames to resynchronize to a first specified number of lines prior to a start of an active region of a second video frame of the plurality of video frames.

6. The method of claim 5, further comprising:
capturing a snapshot of a current value of a counter at a specified number of lines prior to the active region of the first video frame; and
calculating the first predetermined time interval based on the snapshot, wherein a counter controller maintains the temporal count.

7. The method of claim 6, further comprising:
programming a value corresponding to the first predetermined time interval into the counter controller.

8. The method of claim 5, wherein generating a first signal is based on a second predetermined time interval associated with the external timing reference, and wherein the first predetermined time interval equals the second predetermined time interval.

9. The method of claim 1, further comprising:
synchronizing a timing reference of a counter controller maintaining a temporal count associated with the external timing reference with a timing reference of an audio processing device configured to output audio associated with the plurality of video frames.

10. The method of claim 1, further comprising:
enabling a low-power management mode of a display processing device responsive to determining that a duration of a vertical blanking region of the plurality of video frames satisfies a threshold,
wherein transitioning at least one component into the low-power state is further in response to enabling the low-power management mode.

11. The method of claim 1, wherein generating the first signal comprises:
generating the first signal in response to a temporal count synchronized with the external timing reference corresponding to a predetermined time interval; and
maintaining the temporal count using a free-running counter.

12. A method comprising:
capturing a snapshot of a first temporal count at a first specified number of lines prior to an active region of a first video frame of a plurality of video frames;
responsive to capturing the snapshot, calculating a first trigger value based on the snapshot, the first trigger value causing a first signal to be generated for transitioning one or more components of a processing system out of a low-power state prior to a start of an active region of a second video frame of the plurality of video frames; and
programming the first trigger value into a component maintaining the first temporal count.

13. The method of claim 12, wherein at least one of the one or more components is a counter controller implemented by a display processing device.

14. The method of claim 12, further comprising:
responsive to capturing the snapshot, calculating a second trigger value based on the snapshot, the second trigger value causing a second signal to be generated for resynchronizing a timing reference of a display processing device outputting the plurality of video frames to a second specified number of lines prior to the start of the active region of the second video frame; and
programming the second trigger value into at least one of the one or more components.

15. The method of claim 14, wherein the first trigger value equals the second trigger value.

16. A display processing device comprising:
a display device interface;
a processing unit configured to transition at least a first component of the display processing device into a low-power state in response to detecting an active region of a first video frame of a plurality of video frames having been processed; and
a second component configured to maintain a temporal count value during playback of the plurality of video frames, and further to generate a first signal in response to the temporal count value corresponding to a first trigger value, the first trigger value set based on a snapshot of the temporal count value at a specified number of lines before a start of the active region, and the first signal causing at least one component to transition out of the low-power state.

17. The display processing device of claim 16, wherein the first trigger value corresponds to a specified number of lines prior to a start of an active region of a second video frame of the plurality of video frames.

18. The display processing device of claim 16, wherein the processing unit is further configured to:
calculate the first trigger value based on the snapshot; and
program the first trigger value into the second component.

19. The display processing device of claim 16, wherein the second component is further configured to:

generate a second signal in response to the temporal count value of the second component corresponding to a second trigger value, the second signal causing a timing reference of the display processing device to resynchronize to a first specified number of lines prior to a start of an active region of a second video frame of the plurality of video frames.

20. The display processing device of claim 19, wherein the processing unit is further configured to:
capture a snapshot of a current value of the second component at a specified number of lines prior to the active region of the first video frame;
calculate the second trigger value based on the snapshot; and program the second trigger value into the second component.

* * * * *